United States Patent
Anklin et al.

(10) Patent No.: US 7,121,151 B2
(45) Date of Patent: Oct. 17, 2006

(54) CORIOLIS FLOWMETER COMPRISING A STRAIGHT TUBE

(75) Inventors: Martin Anklin, Aesch (CH); Rainer Lorenz, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/496,795

(22) PCT Filed: Nov. 30, 2002

(86) PCT No.: PCT/EP02/13539

§ 371 (c)(1),
(2), (4) Date: Apr. 27, 2005

(87) PCT Pub. No.: WO03/048693

PCT Pub. Date: Jun. 12, 2003

(65) Prior Publication Data

US 2005/0172731 A1 Aug. 11, 2005

(30) Foreign Application Priority Data

Dec. 5, 2001 (DE) ................................ 101 59 809

(51) Int. Cl.
*G01F 1/84* (2006.01)
(52) U.S. Cl. .............................................. 73/861.357
(58) Field of Classification Search ........... 73/861.357, 73/861.18, 861.354, 272 R, 278, 279
See application file for complete search history.

(56) References Cited

U.S. PATENT DOCUMENTS

| | | | |
|---|---|---|---|
| 4,090,382 A | 5/1978 | Schott | |
| 5,610,342 A | 3/1997 | Wenger | |
| 6,698,644 B1* | 3/2004 | Lorenz | 73/861.354 |
| 2001/0006007 A1* | 7/2001 | Davies et al. | 73/861.357 |

FOREIGN PATENT DOCUMENTS

| | | |
|---|---|---|
| DE | 37 24 675 A | 2/1989 |
| WO | WO 00/47956 | 8/2000 |

* cited by examiner

*Primary Examiner*—Harshad Patel
(74) *Attorney, Agent, or Firm*—Bacon & Thomas

(57) ABSTRACT

The sensor includes at least one measuring tube for guiding a fluid The measuring tube an inlet end and an outlet end, and vibrating at least at times. The measuring tube communicates, by way of a first tube segment leading into the inlet end and a second tube segment leading into the outlet end, with a pipeline connected for allowing the fluid to flow through the measuring tube. The measuring tube is held oscillatably by means of a support, which is secured to the first tube segment by means of a first transition piece and to the second tube segment by means of a second transition piece. Especially for producing mass-flow-dependent, Coriolis forces and/or for producing viscosity-dependent frictional forces in flowing fluids, the measuring tube executes, during operation, mechanical oscillations about an oscillation axis (S) imaginarily connecting the two tube segments. For making the holding of the measuring tube twist-safe, at least one of the two transition pieces has a stop with a first stop-edge partially contacting the associated tube segment, respectively, and extending at least sectionally in the direction of the oscillation axis(S). By means of the stop, twisting of the support and measuring tube relative to one another is largely prevented, even in the case of thermally-related expansions and without the use of additional weld- or solder-connections.

21 Claims, 3 Drawing Sheets

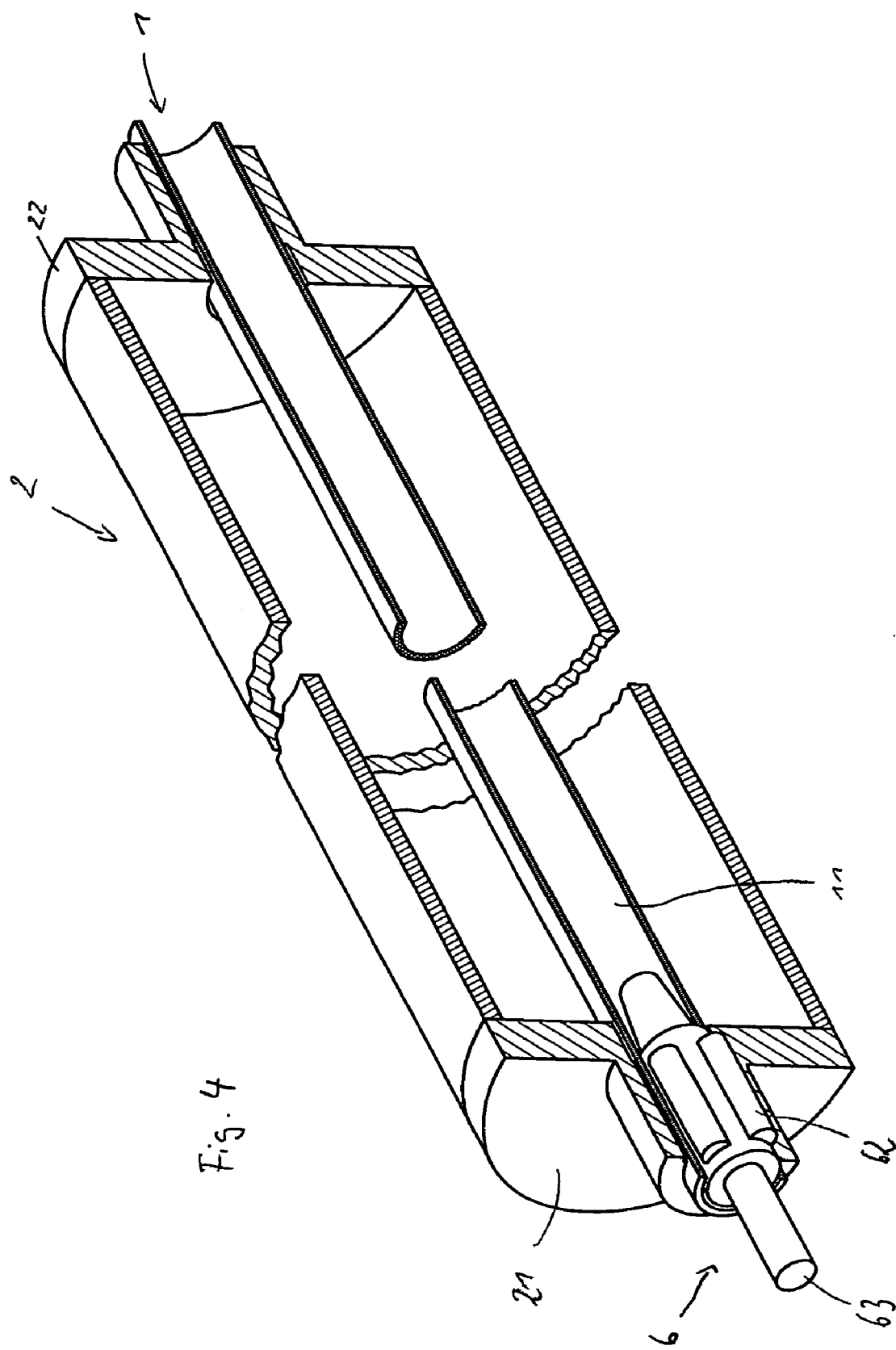

CORIOLIS FLOWMETER COMPRISING A STRAIGHT TUBE

FIELD OF THE INVENTION

The invention relates to a vibration-type sensor. In particular, the invention is concerned with securing of measuring tubes of such vibration-type sensors, especially a mass flow sensor working on the basis of the Coriolis principle, in a support serving for holding the measuring tube.

BACKGROUND OF THE INVENTION

In principle, there are, for such "in-line" sensors serving for measuring a fluid flowing in a pipeline, only two kinds of measuring tubes, these being, on the one hand, straight measuring tubes, and, on the other hand, arbitrarily curved, or even coiled, measuring tube loops, among which the U-shaped ones are the preferred tube forms. Thus, U.S. Pat. Nos. 4,127,028, 4,524,610, 4,768,384, 4,793,191, 4,823,614, 5,253,533, 5,610,342, 6,006,609 and the not pre-published European Patent Application 01 112 546.5 of the present assignee describe vibration-type sensors, especially for producing mass-flow-dependent, Coriolis forces, and/or for producing viscosity-dependent frictional forces, in flowing fluids. Such sensors have at least one measuring tube for guiding a fluid, the measuring tube having an inlet end and an outlet end, and vibrating at least at times, the measuring tube. The measuring tube communicating, by way of a first tube segment leading into the inlet end and a second tube segment leading into the outlet end, with a pipeline connected for allowing the fluid to flow through the measuring tube, and during operation executing mechanical oscillations about an oscillation axis imaginarily connecting the two tube segments. Included is a support for the oscillation-permitting holding of the measuring tube, which support is secured to the first tube segment by means of a first transition piece and to the second tube segment by means of a second transition piece.

Especially in the case of Coriolis mass flow sensors serving for the measuring of mass flow rates, mostly, due to reasons of symmetry, two measuring tubes are employed when using either of the two types of measuring tubes, the straight ones or the looped ones. The two tubes extend, when at rest, parallel to one another, in two parallel planes and, most often, the fluid flows through them in parallel, as well. For the one of the two variants, that with two parallel, straight tubes, reference can be made, purely by way of example, to the U.S. Pat. Nos. 4,768,384, 4,793,191 and 5,610,342, while, for the other, that with two parallel, especially identically-shaped, U-shaped tube loops, see e.g. U.S. Pat. No. 4,127,028.

Besides the aforementioned types of double-tube mass flow sensors working on the Coriolis principle, a further type of sensor has established itself in the market for quite some time now, namely that which uses only a single, straight, or bent, measuring tube. Such sensors are described e.g. in the U.S. Pat. Nos. 4,524,610, 4,823,614, 5,253,533, 6,006,609 and in the not pre-published, European patent application 01 112 546.5.

Additionally, U.S. Pat. No. 4,823,614 describes that each end of the one measuring tube is inserted in a matching bore of an inlet, respectively outlet, transition piece and fixed therein by welding, soldering or brazing; see the material beads visible in some of the figures. The transition pieces are, in turn, secured in an external support.

As already discussed in U.S. Pat. No. 5,610,342, the needed heat supply to the securement locations of the measuring tube to the transition pieces during the mentioned welding, soldering or brazing can produce, upon cooling, residual mechanical stresses, which can lead to stress corrosion cracking, especially when fluids are being measured, which attack the material of the measuring tube to a greater or lesser degree. For eliminating this danger of stress corrosion cracking as completely as possible for measuring tubes of Coriolis mass flow sensors, an improved method of securing measuring tubes in transition pieces has been likewise proposed in U.S. Pat. No. 5,610,342, wherein each end of the measuring tube is inserted in a corresponding bore of an inlet, respectively outlet, transition piece and pressed without the introduction of heat against the wall of the bore by means of a rolling tool placed in such end. A rolling tool appropriate for this method is described, for example, in U.S. Pat. No. 4,090,382 concerning the securing of tubes of boilers or heat exchangers.

Investigations of sensors manufactured by this method have shown, however, that the usually different expansion behaviors of the aforementioned transition pieces and the measuring tube clamped in each can lead to the clamping forces exerted by the transition pieces on the measuring tube falling below a critical value in the presence of temperature fluctuations, especially in the case of possible temperature shocks, such as can occur e.g. during regularly executed cleaning operations using extremely hot washing liquids. This, in turn, can mean that transition piece and measuring tube lose can occur by the mechanical contact brought about by the rolling, due to thermally-caused expansions, so that the support can then twist about the aforementioned oscillation axis relative to the measuring tube. For the then no longer certainly excludable case of such a twisting of the support, especially in the case of sensors with measuring tubes which during operation also execute torsional oscillations about the oscillation axis, a replacement of the entire measuring device becomes practically unavoidable.

SUMMARY OF THE INVENTION

Starting from the above-mentioned disadvantages of the state of the art, an object of the invention is, therefore, to improve sensors of the described type to the effect that, while retaining the advantages won for the manufacture of sensors by the rolling of the measuring tubes, a twisting of the support and measuring tube relative to one another can be largely excluded, even in the case of thermally-related expansions.

For achieving this object, the invention resides in a vibration-type sensor, especially for producing mass-flow-dependent, Coriolis forces, and/or viscosity-dependent frictional forces, in flowing fluids, which sensor includes: at least one measuring tube for guiding a fluid, the measuring tube having an inlet end and an outlet end, and vibrating at least at times, wherein the measuring tube communicates, by way of a first tube segment leading into the inlet end and a second tube segment leading into the outlet end, with a pipeline connected for allowing the fluid to flow through the measuring tube, and during operation executes mechanical oscillations about an oscillation axis imaginarily connecting the two tube segments. A support for the oscillation-permitting holding of the measuring tube, which support is secured to the first tube segment by means of a first transition piece and to the second tube segment by means of a second transition piece, wherein at least one of the two transition pieces has a stop with a first stop-edge partially contacting the associated tube segment and extending at least sectionally in the direction of the oscillation axis.

In a first preferred development of the sensor of the invention, the stop has a second stop-edge partially contacting the associated tube segment and extending at least sectionally in the direction of the oscillation axis.

In a second preferred development of the sensor of the invention, the stop is formed as a groove at least partially filled by material of the associated tube segment.

BRIEF DESCRIPTION OF THE DRAWINGS

The invention and advantageous developments thereof will now be explained in greater detail on the basis of the drawings, whose figures show as follows:

FIG. 4 shows schematically a method step for the manufacture of the mass flow sensor of FIG. 1.

DESCRIPTION OF THE PREFERRED EMBODIMENTS

Figure 1:
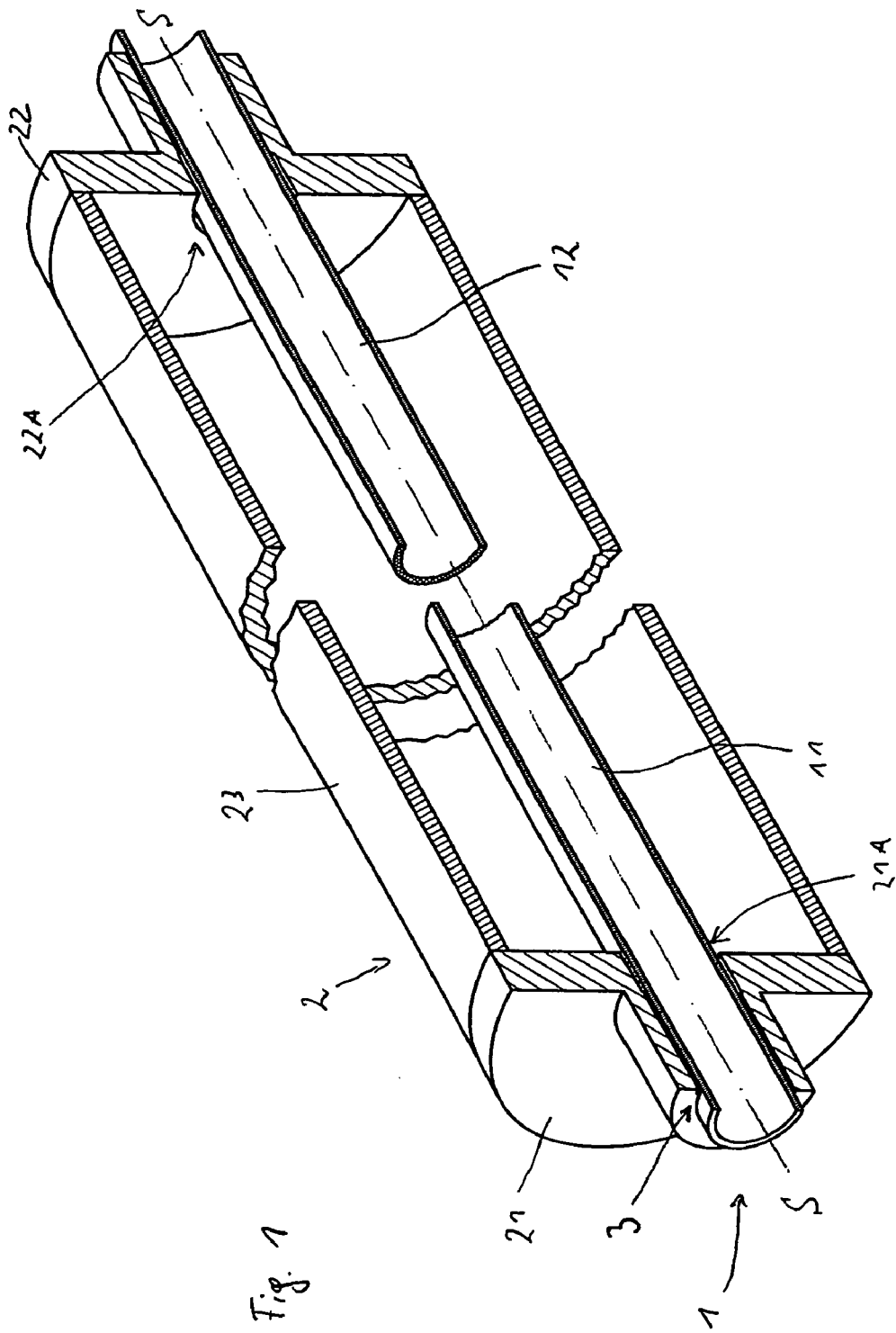
FIG. 1 shows perspectively-schematically and in partially sectioned view an essential part of an example of an embodiment of a mass flow sensor having at least one measuring tube.

Important for the invention are the parts of vibration-type sensors, e.g. a Coriolis mass flow sensor, shown in FIG. 1 of the drawing. Remaining parts likewise required for full functionality have, for reasons of clarity, not been shown; as to omitted parts, reference is made to the aforementioned documents representing the state of the art.

A straight, first tube segment 11, opening into an inlet end of a here only partially shown, operationally-vibrating, measuring tube 1, is received by a bore 21A of a first transition piece 21, while a straight, second tube segment 12, opening into an outlet end of the measuring tube 1, is inserted into a bore 22A of a second transition piece 22. The transition pieces 21, 22 form together with at least one laterally arranged support plate 23 a support 2 clamping the at least one measuring tube 1 such that the tube remains capable of oscillation. This support 2 can be e.g. box-shaped or cylindrical; especially it can be a support tube encasing the measuring tube 1.

In operation, the measuring tube 1 is inserted, e.g. by way of flanges or screwed connections, into the course of a pipeline carrying the flowing fluid to be measured, e.g. a liquid or a gas, so that the fluid to be measured also flows through the measuring tube 1.

For producing reaction forces characterizing the fluid, e.g. Coriolis forces correlated with the mass flow rate, or frictional forces correlated with the viscosity, the measuring tube 1 is caused to vibrate, at least at times, with the two tube elements 11, 12 executing, at least as a participant, torsional oscillations about an oscillation axis S imaginarily connecting the two tube segments 11, 12. For registering vibrations of the measuring tube 1 and for producing vibration signals corresponding to the vibrations, oscillation sensors can be placed in the vicinity of the measuring tube 1, in the manner (not shown) known to those skilled in the art.

For preventing a twisting of the support relative to the tube segments 11, 12 and, consequently, also relative to the measuring tube 1, especially for sensors subjected to wide temperature fluctuations, at least one of the transition pieces 21, 22, here by way of example the transition piece 21, has a stop 3; of course, also the other transition piece 22 can be provided with such a stop, especially one which is in addition to stop 3.

Figure 2:
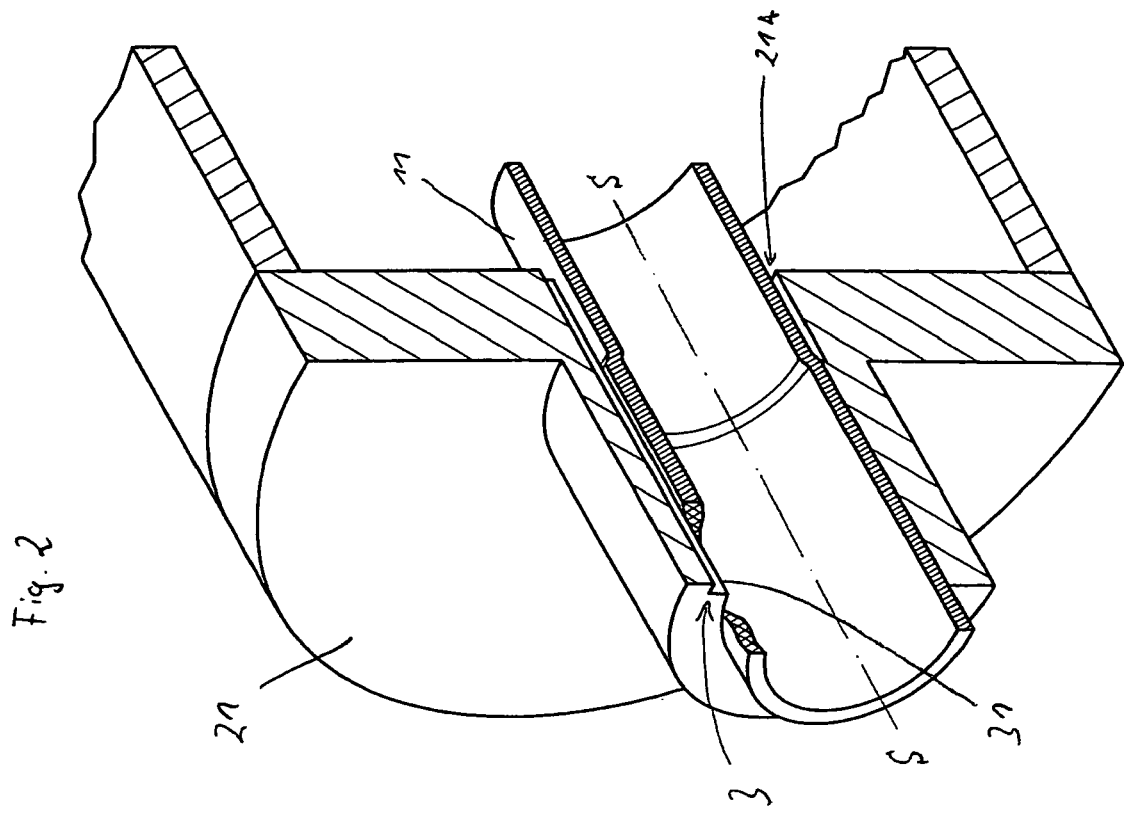
FIG. 2 shows perspectively-schematically and in partially sectioned view, an example of an embodiment of a groove serving as a stop for the twist-safe holding of the measuring tube of FIG. 1.

Stop 3 includes, as shown in FIG. 2, at least one stop-edge 31 contacting a portion of the associated tube segment 11 and extending at least sectionally in the direction of the oscillation axis S. Stop-edge 31 is formed out of, respectively formed on, the associated bore 21A. The stop-edge 31 can, as in fact indicated here in FIG. 2, traverse the bore 21A essentially completely; it can, however, e.g. also extend only over a short section of the bore 21A.

Figure 3:
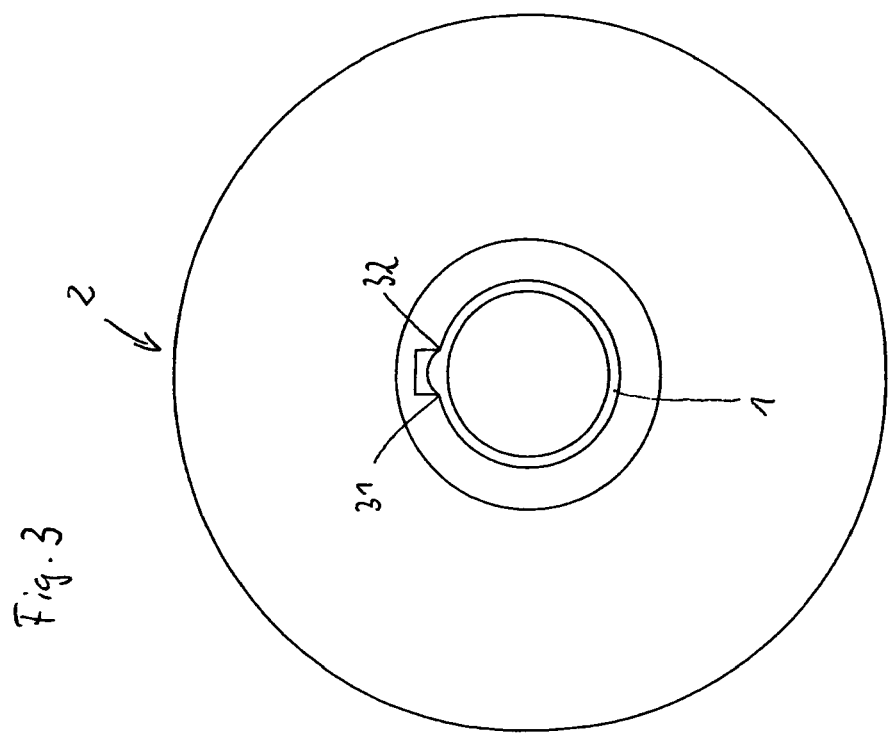
FIG. 3 shows the groove of FIG. 2 in a front view.

In a preferred embodiment of the invention, the stop 3 includes a second stop-edge 32, which is advantageously so formed and so arranged in the bore 21A, that the stop 3 is in the form of a groove at least partially filled by wall material of the associated tube segment 11; see FIG. 3.

The stop-edge 32 can, however, e.g. also be so formed and arranged, that the stop 3 is in the form of a nose at least partially surrounded by wall material of the tube segment 11.

For the measuring tubes of e.g. titanium, stainless steel or zirconium used in such sensors, with measuring tube wall thickness from 0.5 mm to 2 mm, groove depths of e.g. about 0.2 mm for groove widths from 0.5 mm to 2 mm have been found to be sufficient.

The stop 3 is preferably cut into the prefabricated bore 21A by means of a broach. Of course, other metalworking processes known to those skilled in the art, such as e.g. milling or stamping, can be used.

With reference to FIG. 4, for producing the mechanical connection between the measuring tube 1 and the support 3, the tube segment 11 is inserted into the transition piece 21 and the tube segment 12 into the transition piece 22. Following the positioning of the tube segment 11 in the transition piece 21, a rolling tool 6 is placed at least partially into the lumen of the tube segment 11, as shown schematically in the FIG. 4. The rolling tool 6 has a cage 61 on the, in the insertion direction, forward end, with rollers 62 distributed on the cylindrical surface of the cage and set in corresponding openings.

The center circle, on which the rollers 62 move during the turning of the rolling tool 6, has a radius which can be adjusted by means of a plunger 63 movable in the insertion direction. By increasing this radius in comparison to the radius at initial insertion of the rolling tool 6 into the lumen of the tube segment 11, the tool is made to press sectionally against the inner wall of the bore 21A.

The tube segment 11 is now pressed in this way against the inner wall of the associated bore 21A without heat introduction. This leads to a slight yielding of the material of the tube segment 11 and, therewith, a very secure mechanical connection between tube segment 11 and transition piece 21 at these locations, especially in the area of the stop. The pressing pressure produced by means of the rolling tool 6, and the shape and size of the stop, are to be matched to one another in this procedure, such that a sufficient amount of material of the tube segment is caused to flow in the area of the stop 3; see, in this connection, also FIG. 3.

Due to this plastic deformation of the tube segment 11, there is a partial, slight reduction in the thickness of its wall, so that, on the one hand, a mechanical compressive stress arises in the longitudinal direction of the tube segment 11 (called 'axial stress', for short, in the following discussion). This compressive stress occurs, because the tube segment 11 is slightly lengthened. On the other hand, a mechanical compressive stress in the radial direction occurs within the bore 21A (called 'radial stress', for short, in the following discussion). The radial stress can be understood by realizing that, while during the pressing, it is true that the tube segment 11 is deformed plastically, yet, in contrast, the transition piece 21, because of its much greater thickness compared with the wall thickness of the tube segment 11, is essentially only elastically deformed and that, consequently, following the pressing, the transition piece 21 exerts a radial force directed toward the lumen of the tube segment 11.

Now, the radial stress is the principle reason why the deleterious stress-corrosion cracking can be practically avoided, in contrast to the situation in the case of sensors with measuring tube soldered or welded to the support, where stress-corrosion cracking tends to be an ever-present possibility. The axial stress contributes to this avoidance likewise, but to a much lesser degree. In the case of sensors with at least two measuring tubes, the pressing can be especially useful also for the dynamic, optimal balancing of the measuring tubes; see, in this connection, also the U.S. Pat. No. 5,610,342.

A significant advantage of the invention is to be seen in the maintaining of the advantages of the method already described in U.S. Pat. No. 5,610,342 for the manufacture of sensors, namely securing of the measuring tube 1 protectively to the support 2 without weld or solder connections and thus without heat stresses, combined with the achieving, in very simple manner, of a considerable improvement in the strength and especially also the durability of the mechanical connection between measuring tube 1 and support 2.

The invention claimed is:

1. A vibration-type sensor, especially for producing mass-flow-dependent, Coriolis forces, and/or viscosity-dependent frictional forces, in flowing fluids, comprising:
at least one measuring tube for guiding a fluid, said measuring tube having an inlet end and an outlet end, and vibrating at least at times, said measuring tube communicating by way of a first tube segment leading into the inlet end and a second tube segment leading into the outlet end, with a pipeline connected for allowing the fluid to flow through said measuring tube, and during operation executes mechanical oscillations about an oscillation axis imaginarily connecting the two tube segments; and
a support for the oscillation-permitting holding of said measuring tube, which support is secured to said first tube segment by means of a first transition piece and to said second tube segment by means of a second transition piece, wherein:
at least one of said two transition pieces has a stop with a first stop-edge partially contacting the associated tube segment, respectively, and extending at least sectionally in the direction of said oscillation axis.

2. The sensor as claimed in claim 1, wherein:
said stop has a second stop-edge partially contacting said associated tube segments, and extending at least sectionally in the direction of said oscillation axis.

3. The sensor as claimed in claim 2, wherein: said stop is formed as a groove at least partially filled by material of said associated tube segment.

4. The sensor as claimed in claim 2, wherein:
said stop is in the form of a nose at least partially surrounded by wall material of said associated tube segment.

5. The sensor as claimed in claim 2, wherein:
said at least one measuring tube is caused to execute torsional oscillations about said oscillation axis imaginarily connecting said two tube segments.

6. The sensor as claimed in claim 2, wherein:
said at least one measuring tube is caused to vibrate, at least at times, with said two tube elements executing, at least as a participant, torsional oscillations about said oscillation axis.

7. The sensor as claimed in claim 2, further comprising:
oscillation sensors being placed in the vicinity of said at least one measuring tube.

8. The use of a sensor according to claim 2, comprising the step of producing reaction forces characterizing a fluid carried in a pipeline.

9. The use of a sensor according to claim 2, comprising the step of producing Coriolis forces correlated with the mass flow rate of fluid flowing in a pipeline.

10. The use of a sensor according to claim 2, comprising the step of producing frictional forces correlated with the viscosity of a fluid to be measured.

11. The sensor as claimed in claim 1, wherein: each of said first and second transition pieces includes a bore, the bore of said first transition piece receives said first tube segment and the bore of said second transition piece receives said second tube segment.

12. The sensor as claimed in claim 11, wherein: said stop is formed within the bore of said one of said first and second transition pieces.

13. The sensor as claimed in claim 12, wherein: the stop-edge traverses said bore essentially completely.

14. The sensor as claimed in claim 12, wherein: the stop-edge extend only over a short section of said bore.

15. The sensor as claimed in claim 1, wherein: each of said first and second transition piece is provided with at least one stop.

16. The sensor as claimed in claim 1, wherein:
said first and second transition pieces form together with at least one laterally arranged support plate a support clamping the at least one measuring tube such that the tube remains capable of oscillation.

17. The sensor as claimed in claim 16, wherein: the support is box-shaped.

18. The sensor as claimed in claim 16, wherein: the support is a support tube encasing the measuring tube.

19. The use of a sensor according to claim 1, comprising the step of producing reaction forces characterizing a fluid carried in a pipeline.

20. The use of a sensor according to claim 1, comprising the step of producing Coriolis forces correlated with the mass flow rate of fluid flowing in a pipeline.

21. The use of a sensor according to claim 1, comprising the step of producing frictional forces correlated with the viscosity of a fluid to be measured.

* * * * *